United States Patent Office 3,252,968
Patented May 24, 1966

3,252,968
MONOAZO PIGMENTS FROM MALONANILIDES
Paul Resnick, Brooklyn, N.Y., and John J. Maitner, Hazlet, N.J., assignors to Interchemical Corporation, New York, N.Y., a corporation of Ohio
No Drawing. Filed Mar. 25, 1963, Ser. No. 267,791
5 Claims. (Cl. 260—193)

This invention relates to various pigments derived from malonanilides and various diazo components.

The pigments prepared were compared with analogous acetoacetanilide ones, both types being evaluated in a commercial textile printing composition and also in cellulose acetate film as to lightfastness. The syntheses were carried out by coupling malonanilide and malon-2,2′4,4′-tetramethoxy dianilide with diazo components derived from aniline, o-nitroaniline, p-nitroaniline, and p-chloroaniline. The lightfastness tests in the Fade-Ometer showed that the pigments of this invention had from 2 to 10 times the lightfastness of analogous acetoacetanilide pigments. The color of the pigments varied from green-yellow to orange and the color strength was greater than that of the acetoacetanilide pigments. The difference in washfastness and drycleaning fastness of the two types was, however, not very much.

A. Preparation of malonanilide

A mixture of 600 ml. of bis (2-ethoxyethyl) ethers, 80 g. (0.5 mole) of diethylmalonate, and 98 g. (1.05 moles) of aniline was heated the ethanol of reaction being distilled off. 55 ml. (0.95 mole) of ethanol was collected. The reaction mixture was then cooled to room temperature, filtered, and drained as dry as possible with suction. The filter cake was finally slurried in water, filtered, washed and dried. The crude product weighed 105 g. corresponding to 83% of theory. The melting point was found to be 229–230° C., which is the same as that reported in the literature.

B. 2,2′4,4′-tetramethoxy-malonanilide

This compound was prepared in the same way as malonanilide. The quantities were 1200 ml. of bis (2-ethoxyethyl) ether, 335 g. (2.2 mole) of 2,4-dimethoxyaniline, 120 g. (0.75 mole) of diethylmalonate. The crude yield was 240 g. (86% of theory). Recrystallization from 1 liter of bis (2-ethoxyethyl) ether gave 190 g. (80.7% of theory). The melting point of the purified substance was 145° C.

C. Benzenediazonium chloride 5.1 g. (0.05 mole) of aniline were dissolved in 50 ml. of water containing 12 ml. of 37% hydrochloric acid and the solution was cooled to 0° C. with the aid of stirring. Diazotization was carried out with 4.0 g. $NaNO_2$ in 15 ml. $H_2O$ at 0° C.

D. p-Chlorobenzenediazonium chloride

This was prepared by the same method as the preceding compound.

E. O-nitrobenzenediazonium chloride 6.9 g. (0.05 mole) of o-nitroaniline was heated with 25 ml. of 37% HCl. The solution was cooled to 30° C. with stirring and the paste of hydrochloride diluted with 50 ml. water and 50 g. of ice. The amine was diazotized with 3.7 g. of $NaNO_2$ in 20 ml. $H_2O$ by dropwise addition at 0° C. for 1 hour. The resulting diazo solution was filtered cold and used immediately.

F. p-Nitrobenzenediazonium chloride 6.9 g. (0.05 mole) of p-nitroaniline was heated with 14 ml. of 37% hydrochloric acid in 33 ml. of water. The solution was poured into 30 g. of ice to precipitate the hydrochloride. Diazotization was carried out at 0° C. with 3.7 g. of $NaNO_2$ in 15 ml. $H_2O$. The solution was filtered cold and used immediately.

G. General coupling reaction for pigments derived from malonanilide 0.05 mole of malonanilide was dissolved in 400 ml. of pyridine and cooled to 5° C. by means of external cooling. The cold diazo component was added dropwise with stirring over a period of 1 hour at 5 to 10° C. Stirring was continued at about 10° C. until the coupling was complete. The product was filtered and slurried in 500 ml. of water and again filtered, washed, and dried. The crude product was then recrystallized from a suitable solvent.

H. General coupling reaction for reference pigments derived from acetoacetanilides 0.05 mole of the acetoacetanilide was dissolved in 150 ml. of 2% sodium hydroxide solution. The clear solution was cooled and 0.09 mole of crystalline sodium acetate added. Dilute acetic acid was then added until the solution was faintly acid to litmus but no precipitation occurred. The diazo component was added dropwise, with stirring at 0 to 5° C. to precipitate the pigment. Stirring was continued overnight, allowing room temperature to be attained. The pigment was filtered, washed, dried at 45° C., and recrystallized from an appropriate solvent.

The malonanilide pigments prepared had the following melting points.

Phenylazomalonanilide—180–181° C.
o-Nitrophenylazomalonanilide—226–228° C.
p-Nitrophenylazomalonanilide—282–284° C.
p-Chlorophenylazomalonanilide—203–205° C.
Phenylazo-2,2′4,4′-$(OCH_3)_4$-malonanilide—209–211° C.
o-Nitrophenylazo-2,2′4,4′-$(OCH_3)_4$-malonanilide—278–281° C.
p-Nitrophenylazo-2,2′4,4′-$(OCH_3)_4$-malonanilide—256–258° C.

The acetoacetanilide pigments prepared and their melting point are listed below.

Phenylazoacetoacetoanilide—108° C.
o-Nitrophenylazoacetoanilide—207–210° C.
p-Nitrophenylazoacetoanilide—226° C.
p-Chlorophenylazoacetoanilide—150° C.
Phenylazoacetoacet-2,4-$(OCH_3)$-anilide—131–133° C.
o-Nitrophenylazoaceto-2,4-$(OCH_3)$-anilide—203–206° C.
p-Nitrophenylazoacetoacet-2,4-$(OCH_3)_2$-anilide—240–242° C.

What is claimed is:
1. A pigment consisting of phenylyazomalonanilides selected from the group consisting of mononitro-phenylazomalonanilides, mononitrophenylazo-2,2′4,4′-$(OCH_3)_4$-malonanilides, and p-chlorophenylazomalonanilide.
2. A pigment consisting of a mononitrophenylazomalonanilide.
3. A pigment consisting essentially of a mononitrophenylazo-2,2′4,4′-$(OCH_3)_4$-malonanilide.
4. A pigment consisting essentially of o-nitrophenylazo-2,2′4,4′-$(OCH_3)_4$-malonanilide.
5. A pigment consisting of p-chlorophenylazomalonanilide.

References Cited by the Examiner
UNITED STATES PATENTS
2,473,403  6/1949  Woodward _____ 260—193 X
2,556,743  6/1951  Long et al. _____ 260—193 X OTHER REFERENCES
Saunders: "The Aromatic Diazo Compounds" (1949), p. 215.

CHARLES B. PARKER, *Primary Examiner.*